Nov. 24, 1931.                A. BARR ET AL                 1,833,553
            OPTICAL MEASURING INSTRUMENT, SUCH AS INCLINOMETERS,
                 RANGE FINDERS, HEIGHT FINDERS, AND THE LIKE
                          Filed Jan. 11, 1930
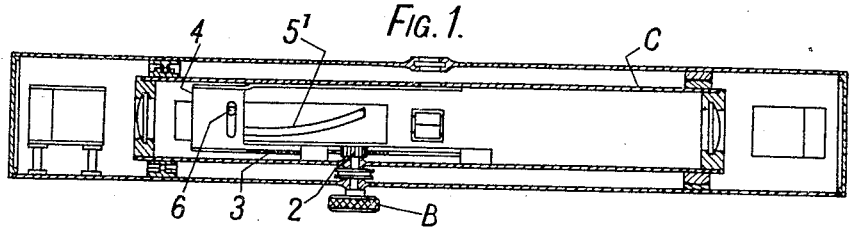
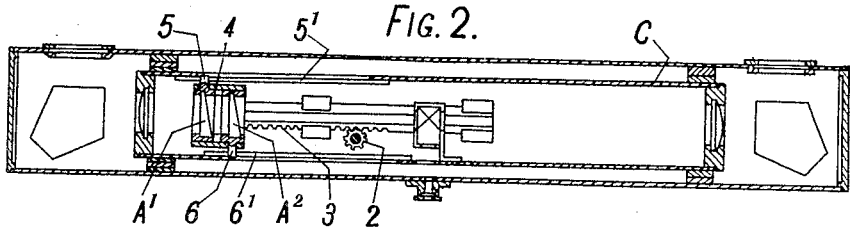
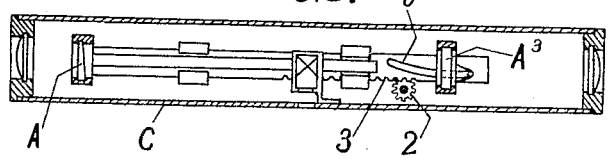
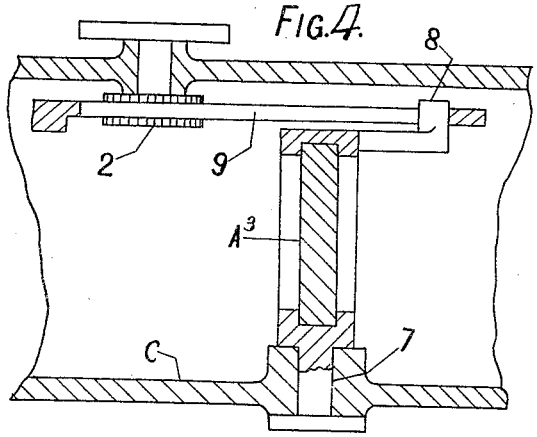 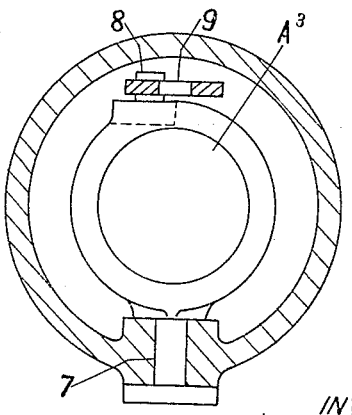
INVENTOR
Archibald Barr
BY John M. Strang
Ritter, Mechlin & O'Neil
ATTORNEYS Patented Nov. 24, 1931

1,833,553

UNITED STATES PATENT OFFICE

ARCHIBALD BARR AND JOHN MARTIN STRANG, OF ANNIESLAND, GLASGOW, SCOTLAND, ASSIGNORS TO BARR AND STROUD, LIMITED, OF GLASGOW, SCOTLAND

OPTICAL MEASURING INSTRUMENT, SUCH AS INCLINOMETERS, RANGE FINDERS, HEIGHT FINDERS, AND THE LIKE

Application filed January 11, 1930, Serial No. 420,205, and in Great Britain January 23, 1929.

This invention relates to improvements in or connected with optical measuring instruments, such as inclinometers, constant base single observer rangefinders, heightfinders, and the like, of the type in which the measurement of angle is made by displacement of the image or images of the object as seen in the eyepiece of the instrument which is produced by movement longitudinally only of a refracting prism, or prisms, of small angle, to and fro along the path of one, or both, of the convergent beams of light. In such instruments the refracting prism (or each of the prisms) is maintained with its maximum deviation in the plane of triangulation, its position angularly is not altered, and consequently the form of the scale is a scale of angles, which, say for ranges, is a reciprocal scale, having the spacing crowded together at the high ranges compared with the spacing at the low ranges. In the description and claims such instruments will be referred to generally as optical measuring instruments of the type defined.

The object of this invention is to make provision whereby the form of the scale of measurement of such instrument is modified from that given by longitudinal movement only of the refracting prism or prisms, for example, to give indications of range on a uniform scale, or on a uniform scale of logarithm of range, or on a uniform scale of other function of range or of parallax.

According to this invention, an optical measuring instrument of the type defined comprises, in combination with a longitudinally movable refracting prism and means for moving the prism longitudinally, an angularly movable refracting member in the optical system of the instrument, and means operated by the prism-moving means for causing relative angular movement between the prism and the refracting member as the prism is moved longitudinally, the relative angular movement having a predetermined relationship to the longitudinal movement, whereby the displacement of the image or images is determined.

In the following description the application of the invention to a rangefinder of the type referred to will be described.

In one example according to this invention, two equal refracting prisms are mounted in close proximity and are movable longitudinally to and fro along the axis of one of the beams of light and are movable angularly in opposite directions about the axis of the beam. In this arrangement as the two prisms are moved longitudinally, they are simultaneously moved angularly in opposite directions.

The angular movement of the prisms may be arranged to be symmetrical from the position where the maximum deviation of both prisms is in the plane of the triangulation, and such that as the prisms move angularly from that position, the component of their combined deviation in the plane of triangulation decreases while the components of their deviations in the plane at right angles neutralize each other.

If the two prisms were of equal refraction an error in halving would be introduced by their movement angularly if they were moved through equal and opposite angles. This error is due to the linear displacement of the beam in passing through the prisms. To eliminate this effect, unequal amounts of angular movement may be imparted to the prisms, as they move longitudinally along the beam. Alternatively the two prisms may be made unequal in deviation by the amount necessary to maintain halving correct with equal movement angularly in opposite directions.

In another example two single refracting prisms are used, one in each of the beams of light, these prisms being movable longitudinally and simultaneously movable angularly. In this case prisms of equal refraction may be used and their movements longitudinally and angularly may be equal as the angular movement of the prisms may be arranged to cause each of the two images in the rangefinder to move in the halving direction by the same amount and in the same direction. The apparent effect in the rangefinder would then be a slight alteration in elevation while halving would remain correct.

In a further example a refracting prism is provided in one of the convergent beams of the rangefinder movable longitudinally only, and a refracting prism, say a prism of zero refracting angle, that is a parallel plate of glass, is provided in one of the convergent beams which is movable angularly only about an axis perpendicular to the plane of triangulation and simultaneously with the longitudinally moving prism.

Some examples of means according to this invention will now be described with reference to the accompanying drawings, in which:—

Figure 1 is a sectional elevation and Figure 2 is a sectional plan illustrating a rangefinder and one example of means.

Figure 3 is a sectional plan, Figure 4 is a sectional elevation of a part of Figure 3 and Figure 5 is a sectional end view of Figure 4 illustrating a portion of a rangefinder and a third example of means.

The example illustrated at Figures 1 and 2 comprises two refracting prisms $A^1$, $A^2$, which are movable longitudinally to and fro along the path of one of the convergent beams, and are movable angularly about the axis of the beam, in opposite directions. These movements are produced by rotational motion applied to a working head B which is transmitted to pinion and rack and pin and cam mechanisms. In the example illustrated there is a pinion 2 rotatable with the head B, a rack 3 meshing with the pinion 2, a carrier 4 movable longitudinally with the rack 3, two frames, one for prism $A^1$ the other for prism $A^2$, which with the prisms are movable angularly in the carrier 4, the frame of prism $A^1$ has a radial pin 5 and the frame of prism $A^2$ has a radial pin 6, these pins engage respectively with cam slots $5^1$ and $6^1$ formed in plates which are fixed within a tube C by which the objectives and eyepiece prism combination of the rangefinder are carried. Thus, as carrier 4 and with it prisms $A^1$, $A^2$ are moved longitudinally with rack 3, the engagement of pins 5 and 6 with the cam slots $5^1$ and $6^1$, respectively, causes the prisms $A^1$, $A^2$ to be also moved angularly in opposite directions.

In the example illustrated at Figures 3, 4 and 5, there is one refracting prism A in one of the beams, movable longitudinally only, and in the other convergent beam there is a parallel plate of glass $A^3$ which is movable angularly only about a transverse axis which is perpendicular to the plane of triangulation. As in the former examples prism A is movable endwise by pinion 2 meshing with rack 3 on which prism A is mounted. The plate of glass $A^3$ is mounted in a frame which is movable angularly about a pivot 7 and is provided with an arm having a pin 8 which engages in a cam slot 9 formed in a plate which is movable longitudinally with the rack 3.

We claim:—

1. An optical measuring instrument of the type defined comprising, in combination with a longitudinally movable refracting prism and means for moving the prism longitudinally, an angularly movable refracting member in the optical system of the instrument, and means operated by the prism-moving means for causing relative angular movement between the prism and the refracting member as the prism is moved longitudinally, the relative angular movement having a predetermined relationship to the longitudinal movement.

2. An optical measuring instrument of the type defined comprising, in combination with a longitudinally movable refracting prism and means for moving said prism, an angularly movable refracting member in the optical system of the instrument, and means operated by the prism-moving means for simultaneously causing relative angular movement between the prism and the refracting member about an axis parallel with the base of triangulation as the prism is moved longitudinally, the relative angular movement having a predetermined relationship to the longitudinal movement.

3. An optical measuring instrument of the type defined, comprising a longitudinally and angularly movable refracting prism, a refracting member in the optical system of the instrument movable longitudinally and angularly, means for moving the prism longitudinally and simultaneously moving the refracting member longitudinally, and means operated by the prism-moving means for causing angular movement of the prism and of the refracting member simultaneously in opposite directions during their longitudinal movement, the angular movements having a pre-determined relationship to the longitudinal movement.

4. An optical measuring instrument of the type defined, comprising a longitudinally and angularly movable refracting prism, a refracting member in the optical system of the instrument movable longitudinally and angularly, means for moving the prism longitudinally and simultaneously moving the refracting member longitudinally, and means operated by the prism-moving means for causing angular movement of the prism and of the refracting member simultaneously in opposite directions about an axis parallel with the base of triangulation during their longitudinal movement, the angular movements having a pre-determined relationship to the longitudinal movement.

5. An optical measuring instrument of the type defined comprising a longitudinally and angularly movable refracting prism in one of the convergent beams of light, a refracting member in the same beam of light and movable longitudinally and angularly, means for moving the prism longitudinally and simultaneously moving the refracting member longitudinally, and means operated by the prism-moving means for causing angular movement of the prism and of the re-refracting member simultaneously in opposite directions during their longtiudinal movement, the angular movements having a predetermined relationship to the longitudinal movement.

6. An optical measuring instrument of the type defined comprising a longitudinally and angularly movable refracting prism in one of the convergent beams of light, a refracting member in the other of the convergent beams of light and movable longitudinally and angularly, means for moving the prism longitudinally and simultaneously moving the refracting member longitudinally, and means operated by the prism moving means for causing angular movement of the prism and of the refracting member simultaneously during their longitudinal movement, the angular movements having a pre-determined relationship to the longitudinal movement.

7. An optical measuring instrument of the type defined comprising, in combination with a longitudinally movable refracting prism and means for moving said prism, a refracting member in the optical system of the instrument angularly movable about an axis perpendicular to the plane of triangulation but longitudinally fixed, and means operated by the prism-moving means for causing angular movement of the refracting member as the prism is moved longitudinally, the relative angular movement having a pre-determined relationship to the movement longitudinally.

ARCHIBALD BARR.
JOHN MARTIN STRANG.